United States Patent
Lee et al.

(10) Patent No.: US 11,872,519 B2
(45) Date of Patent: Jan. 16, 2024

(54) CARBON DIOXIDE ABSORBENT AND METHOD FOR SEPARATING OUT CARBON DIOXIDE BY USING SAME

(71) Applicants: SOGANG UNIVERSITY RESEARCH FOUNDATION, Seoul (KR); UNIVERSITY-INDUSTRY COOPERATION GROUP OF KYUNG HEE UNIVERSITY, Yongin-si (KR); KOREA CARBON CAPTURE & SEQUESTRATION R & D CENTER, Daejeon (KR); KOREA INSTITUTE OF ENERGY RESEARCH, Daejeon (KR)

(72) Inventors: Kwang Soon Lee, Seoul (KR); Hoon Sic Kim, Seoul (KR); Hui Yong Kim, Seoul (KR); Jung Hwan Kim, Goyang-si (KR); Sung June Hwang, Incheon (KR); Ja Yeop Kim, Seoul (KR); Shin Young Bae, Seoul (KR); Su Jin Na, Incheon (KR); Sang Do Park, Incheon (KR); Tae Sung Park, Daejeon (KR); Yun Je Lee, Daejeon (KR); Jong Kyun You, Daejeon (KR)

(73) Assignees: SOGANG UNIVERSITY RESEARCH FOUNDATION, Seoul (KR); UNIVERSITY-INDUSTRY COOPERATION GROUP OF KYUNG HEE UNIVERSITY, Yongin-si (KR); KOREA CARBON CAPTURE & SEQUESTRATION R&D CENTER, Daejeon (KR); KOREA INSTITUTE OF ENERGY RESEARCH, Daejeon (KR)

(*) Notice: Subject to any disclaimer, the term of this patent is extended or adjusted under 35 U.S.C. 154(b) by 0 days.

(21) Appl. No.: 16/966,199

(22) PCT Filed: Oct. 16, 2018

(86) PCT No.: PCT/KR2018/012171
§ 371 (c)(1),
(2) Date: Jul. 30, 2020

(87) PCT Pub. No.: WO2019/164081
PCT Pub. Date: Aug. 29, 2019

(65) Prior Publication Data
US 2021/0039040 A1    Feb. 11, 2021

(30) Foreign Application Priority Data
Feb. 22, 2018    (KR) .................. 10-2018-0020969

(51) Int. Cl.
B01D 53/14    (2006.01)

(52) U.S. Cl.
CPC ..... B01D 53/1493 (2013.01); B01D 53/1425 (2013.01); B01D 53/1475 (2013.01);
(Continued)

(58) Field of Classification Search
None
See application file for complete search history.

(56) References Cited

U.S. PATENT DOCUMENTS

| 2006/0104877 A1 | 5/2006 | Cadours et al. |
| 2010/0011958 A1 | 1/2010 | Cadours et al. |

(Continued)

FOREIGN PATENT DOCUMENTS

| KR | 10-2013-0000375 A | 1/2013 |
| KR | 10-1549950 B1 | 9/2015 |

(Continued)

OTHER PUBLICATIONS

International Search Report, issued in PCT/KR2018/012171, PCT/ISA/210, dated Apr. 10, 2019.
(Continued)

*Primary Examiner* — Daniel Berns
(74) *Attorney, Agent, or Firm* — Birch, Stewart, Kolasch & Birch, LLP (57) ABSTRACT

Disclosed is a carbon dioxide absorbent and a carbon dioxide separation method using the same that greatly reduces energy consumption due to a small amount of latent heat required in regeneration of absorbents, enhances $CO_2$ absorption rate, undergoes almost no thermal denaturation
(Continued)

even at high temperatures while absorbing carbon dioxide, and results in a considerable reduction of the cost associated with absorption of carbon dioxide.

6 Claims, 4 Drawing Sheets

(52) U.S. Cl.
CPC .. *B01D 2252/103* (2013.01); *B01D 2252/205* (2013.01); *B01D 2252/2025* (2013.01); *B01D 2252/2026* (2013.01); *B01D 2252/20415* (2013.01); *B01D 2252/504* (2013.01)

(56) References Cited

U.S. PATENT DOCUMENTS

| | | |
|---|---|---|
| 2012/0279393 A1 | 11/2012 | Menzel et al. |
| 2016/0001220 A1 | 1/2016 | Higashii et al. |
| 2017/0225118 A1 | 8/2017 | Kim et al. |
| 2017/0246587 A1 | 8/2017 | Hong et al. |

FOREIGN PATENT DOCUMENTS

| | | |
|---|---|---|
| KR | 10-2015-0121152 A | 10/2015 |
| KR | 10-1588244 B1 | 1/2016 |

OTHER PUBLICATIONS

Written Opinion of the International Searching Authority, issued in PCT/KR2018/012171, PCT/ISA/237, dated Apr. 10, 2019.

CARBON DIOXIDE ABSORBENT AND METHOD FOR SEPARATING OUT CARBON DIOXIDE BY USING SAME

CROSS REFERENCE TO RELATED APPLICATIONS

This application is the National Phase of PCT/KR2018/012171 filed on Oct. 16, 2018, which claims priority under 35 U.S.C. § 119(a) to Patent Application No. 10-2018-0020969 filed in the Republic of Korea on Feb. 22, 2018, all of which are hereby expressly incorporated by reference into the present application.

TECHNICAL FIELD

The present invention relates to a carbon dioxide absorbent and a carbon dioxide separation method using the same, and more particularly to a carbon dioxide absorbent and a carbon dioxide separation method using the same that greatly reduces energy consumption due to a small amount of latent heat required in regeneration of absorbents, enhances the rate of carbon dioxide absorption, undergoes almost no thermal denaturation even at high temperatures while absorbing carbon dioxide, and results in a considerable reduction of the cost associated with absorption of carbon dioxide.

BACKGROUND ART

In general, carbon dioxide ($CO_2$) can be separated from natural gas and exhaust gas emitted from chemical plants, power plants, or large-sized furnaces by a variety of separation techniques: absorption, adsorption, membrane gas separation, and cryogenic separation. Among these techniques, absorption or adsorption is widely used for separation of low-concentration carbon dioxide.

Absorption and adsorption techniques are common methods to perform gas separation as they can selectively separate a specific gas likely to be absorbed and adsorbed onto an absorbent and an adsorbent, respectively. But, the absorbent and the adsorbent are susceptible to a chemical denaturation during the separation process and need to be replaced periodically. Solid adsorbents are less likely to undergo a chemical denaturation and favorably used only when the life cycle for adsorbent is long. In contrast, liquid absorbents, typically used in the absorption separation method, are easy to replace and have a greater sorption capacity than the adsorbents, so they are widely used in performing gas separation or purifying emission gas in large quantities. Yet, the absorbents are prone to getting a chemical or thermal denaturation.

The most commonly available carbon dioxide absorbents are an aqueous solution of amines, such as monoethanolamine (MEA), N-methyldiethanolamine (MDEA), diethanolamine (DEA), etc. for industrial use purpose. The reason that the carbon dioxide absorbents are most popular lies in the mechanism of the absorbents: an alkanolamine absorbent reacts with carbon dioxide to form a carbamate compound; the carbamate compound, upon heated up, becomes decomposed to release carbon dioxide and the amine adsorbent is regenerated; and the carbon dioxide is captured. But, this process has some problems. First of all, impurities contained in the combustion exhaust gas, such as sulfur dioxide ($SO_2$), oxygen ($O_2$), or nitrogen oxides ($NO_x$), cause irreversible production and decomposition of amine compounds, which deteriorates the performance of the absorbent and results in corrosion of equipment. Secondly, the carbamate compound produced by the reaction of the absorbent with carbon dioxide has such high thermal and chemical stabilities as to increase the regeneration temperature to 120° C. or above. This brings about large energy consumption (for an MEA absorbent, 4.0 to 4.2 GJ per ton of carbon dioxide) and loss of alkanolamine (for MEA, typically 4 kg per ton of carbon dioxide) as well. Thirdly, such a loss of alkanolamine goes with a need of adding or replacing the absorbent and cause lowering carbon dioxide purity in the regeneration process due to low vapor pressure of the absorbent.

In order to make up for the weaknesses of the aqueous amine-based absorbents, there are reported some methods of using organic solvents, such as Selexol, IFPexol, NFM, etc., for the purpose of physical absorption of carbon dioxide. The most important advantage of the organic solvent absorbents lies in that far less energy is required in capturing carbon dioxide and regenerating the solvent because the absorption of carbon dioxide involves a physical interaction between the absorptive solvent and carbon dioxide, but not a chemical bonding as between an aqueous solution of amine and carbon dioxide. In effect, when using an amine absorbent, an energy-intensive high-temperature desorption process is required in performing the capture of carbon dioxide and regeneration of the absorbents. Contrarily, when using a physical absorbent, it is possible to capture the carbon dioxide dissolved in a solvent simply by changing the pressure without increasing the temperature. But the physical absorbent has a far lower carbon dioxide absorption capacity than the aqueous solution of amine in separation of carbon dioxide from a low-pressure combustion gas, and hence the circulation rate of the absorbent is so high as to require equipment in larger size. On account of this, there has been a demand for developing a novel chemical absorbent that displays high thermal and chemical stabilities and low vapor pressure and is capable of overcoming the drawbacks of the conventional amine absorbents or organic solvent absorbents.

For a reduction of energy consumption for regeneration of chemical absorbents, attempts have recently been made to use alkanolamine absorbents that have steric hindrance around the amine group of alkanolamine. A representative example of the alkanolamine is a primary amine called 2-amino-2-methyl-1-propanol (AMP). AMP reacts with carbon dioxide to form a bicarbonate compound, which is much easier to regenerate than carbamate. For this reason, AMP is desirably 30% lower in regeneration energy than MEA, but its carbon dioxide absorption rate is not up to 50% of MEA's.

For increasing the absorption rate of AMP, there has been developed an absorbent prepared by adding piperazine as a secondary cycloamine to AMP, which absorbent is patented by Mitsubishi Heavy Industries, Ltd. in conjunction with Kansai Power Company Co., Ltd. (JP 3197173). Yet, the patent uses an excess of piperazine, causing precipitation after absorption of carbon dioxide, and involves a reaction of piperazine and carbon dioxide to form a stable carbamate compound as well as bicarbonate, undesirably making it difficult to regenerate the absorbent.

Also known is a method of using an alkali carbonate such as sodium carbonate or potassium carbonate instead of a primary alkanolamine-based absorbent such as MEA for absorption of carbon dioxide, but the method is problematic in that the carbon dioxide absorption rate is slow. Another approach to increasing the carbon dioxide absorption rate is disclosed in WO2004-089512, which involves adding piperazine or its derivative to potassium carbonate to greatly increase the carbon dioxide absorption rate of the potassium carbonate, but still has a problem that a precipitation takes place due to the use of carbonates.

Further, the carbon dioxide absorbent may be a triamine, in which case triamine is susceptible to thermal denaturation at high temperatures while the carbon dioxide is absorbed onto the absorbent.

DISCLOSURE OF INVENTION

Technical Problem

For the sake of solving the problems with the prior art, it is an object of the present invention to provide a carbon dioxide absorbent and a carbon dioxide separation method using the same that greatly reduces energy consumption in regeneration of absorbents and enhances the carbon dioxide absorption rate.

It is another object of the present invention to provide a carbon dioxide absorbent and a carbon dioxide separation method using the same that causes almost no thermal denaturation at high temperatures while carbon dioxide is absorbed on the absorbent and reduces a cost associated with the absorption of carbon dioxide.

The above and other objects and advantages of the present invention will be more apparent from the following descriptions of the preferred embodiments of the present invention.

Technical Solution

To achieve the objects of the present invention, there is provided a carbon dioxide absorbent including a triamine represented by the following chemical formula 1 and an ether represented by the following chemical formula 2,

[Chemical Formula 1]

[Chemical Formula 2]

In the chemical formulas 1 and 2, $R_1$, $R_2$, $R_3$, and $R_4$ are independently hydrogen or C1-C4 alkyl; $R_5$ is hydrogen or C1-C4 alkyl; m is an integer of 2 or 3; $R_6$ and $R_7$ are independently C1-C4 alkyl; $R_8$ is hydrogen or methyl; and p is an integer of 4.

Preferably, the triamine represented by the chemical formula 1 may be selected from the group consisting of 2,2'-iminobis(N,N-dimethylethylamine), 2,2'-iminobis(N,N-diethylethylamine), 3,3'-iminobis(N,N-dimethylpropylamine), 3,3'-iminobis(N,N-diethylpropylamine), 2,2'-iminobis(N,N'-dimethylethylamine), N,N-bis[2-(methylamino)ethyl]methylamine, N,N-bis[3-(methylamino)propyl]methylamine, N,N'-(iminobisethylene)bismethaneamine, and N,N'-(iminobispropylene)bismethaneamine.

Preferably, the ether represented by the chemical formula 2 may be a tetraalkylene glycol dialkyl ether and selected from the group consisting of tetraethylene glycol dimethyl ether, tetraethylene glycol diethyl ether, tetraethylene glycol dipropyl ether, tetraethylene glycol dibutyl ether, tetrapropylene glycol dimethyl ether, tetrapropylene glycol diethyl ether, tetrapropylene glycol dipropyl ether, and tetrapropylene glycol dibutyl ether.

Preferably, the triamine may be contained in an amount of 50 to 90 wt. % with respect to the total weight of the absorbent.

Preferably, the ether may be contained in an amount of 20 to 40 wt. % with respect to the total weight of the absorbent.

Preferably, the carbon dioxide absorbent may be dissolved in water before use.

Preferably, the water may be used in an amount of 1.0 to 10.0 wt. % with respect to the total weight of the absorbent.

Preferably, the water may be used in an amount of 1.0 to 9.0 wt. % with respect to the total weight of the absorbent.

For solving the objects of the present invention, there is also provided a carbon dioxide separation method including: (1) using the carbon dioxide absorbent to absorb carbon dioxide from a gas mixture including carbon dioxide; and (2) desorbing the captured carbon dioxide from the carbon dioxide absorbent.

Preferably, an absorption temperature in the step (1) may range from 20° C. to 60° C.

Preferably, an absorption pressure in the step (1) may range from atmospheric pressure to 30 atm.

Preferably, a desorption temperature in the step (2) may range from 70° C. to 150° C.

Preferably, a desorption pressure in the step (2) may range from atmospheric pressure to 10 atm.

Effects of Invention

The present invention generates only a small amount of water vaporization in the regeneration of an absorbent and hence requires less latent heat, thereby greatly reducing energy consumption for regeneration of the absorbent and greatly enhancing carbon dioxide absorption rate.

Further, the present invention causes almost no thermal denaturation even at high temperatures while carbon dioxide is absorbed on the absorbent, and reduces a cost associated with the absorption of carbon dioxide.

The effects of the present invention are not limited to those mentioned above and other effects will be definitely understood by those skilled in the art by way of the following description.

BEST MODES FOR CARRYING OUT THE INVENTION

Hereinafter, the present invention will be described in further detail with reference to examples. It will be obvious to those skilled in the art that these examples are illustrative purposes only and are not construed to limit the scope of the present invention.

In one aspect of the present invention, there is provided a carbon dioxide absorbent including a triamine represented by the following chemical formula 1 and an ether represented by the following chemical formula 2,

[Chemical Formula 1]

[Chemical Formula 2]

In the chemical formulas 1 and 2, $R_1$, $R_2$, $R_3$, and $R_4$ are independently hydrogen or C1-C4 alkyl; $R_5$ is hydrogen or C1-C4 alkyl; m is an integer of 2 or 3; $R_6$ and $R_7$ are independently C1-C4 alkyl; $R_8$ is hydrogen or methyl; and p is an integer of 4.

The inventors of the present invention have found out that the conventional carbon dioxide absorbents using triamine as a main absorbent constituent are undesirably susceptible to thermal denaturation at high temperatures while absorbing carbon dioxide and apt to generate a large amount of water vapor during regeneration as in the case of the existing aqueous absorbents most part of which are composed of water, so they require a large amount of latent heat, resulting in high energy consumption for regeneration and reduction of absorption rate. In an attempt to solve the problems with the prior art, the inventors of the present invention have devised the present invention.

The triamine represented by the chemical formula 1 may be selected from the group consisting of 2,2'-iminobis(N,N-dimethylethylamine), 2,2'-iminobis(N,N-diethylethylamine), 3,3'-iminobis(N,N-dimethylpropylamine), 3,3'-iminobis(N,N-diethylpropylamine), 2,2'-iminobis(N,N'-dimethylethylamine), N,N-bis[2-(methylamino)ethyl]methylamine, N,N-bis[3-(methylamino)propyl]methylamine, N,N'-(iminobisethylene)bismethaneamine, and N,N'-(iminobispropylene)bismethaneamine.

The use of a substance of the chemical formula 2 in combination with a substance of the chemical formula 1 may be a solution to all of the problems with the prior art.

In particular, when p is an integer of 2 or 3 in the chemical formula 2, the absorbent has high absorption heat and hence low energy efficiency, displays high evaporation loss of diethylene glycol butyl ether (DEGBME) and triethylene glycol dimethyl ether (TriEGDME), and undergoes thermal denaturation of triamine even with the water content greatly reduced to 10 wt. % with respect to the total weight of the absorbent (Refer to Comparative Examples 1 and 2). When p is an integer of 5 or greater in the chemical formula 2, the viscosity of the absorbent is undesirably increased to reduce the carbon dioxide absorption rate and render the absorbent difficult to transfer.

In the present invention, p in the chemical formula 2 is preferably an integer of 4. The ether represented by the chemical formula 2 may be a tetraalkylene glycol dialkyl ether and selected from the group consisting of tetraethylene glycol dimethyl ether, tetraethylene glycol diethyl ether, tetraethylene glycol dipropyl ether, tetraethylene glycol dibutyl ether, tetrapropylene glycol dimethyl ether, tetrapropylene glycol diethyl ether, tetrapropylene glycol dipropyl ether, and tetrapropylene glycol dibutyl ether. That is, even when the content of water is in the range of 1 to 10 wt.-%, more preferably 1 to 9 wt. % with respect to the total weight of the absorbent, the present invention neither has the above-mentioned problems associated with an increase in the viscosity nor requires a large amount of latent heat, thereby desirably resulting in a great reduction of energy consumption for regeneration of the absorbent.

In the present invention, the triamine may be contained in an amount of 50 to 90 wt. % with respect to the total weight of the absorbent. A content of the triamine less than 50 wt. % with respect to the total weight of the absorbent reduces the carbon dioxide absorption capacity, so that more of the absorbent needs to be circulated in capturing a same amount of carbon dioxide. With a content of the triamine greater than 90 wt. %, the viscosity of the absorbent is increased so high as to make the process unworkable.

In the present invention, the ether represented by the chemical formula 2 may be contained in an amount of 20 to 40 wt. % with respect to the total weight of the absorbent. A content of the ether less than 20 wt. % with respect to the total weight of the absorbent renders the absorbent susceptible to thermal denaturation more severely and results in having an insignificant effect in improving the absorption rate. Further, a content of the ether above 40 wt. % causes a phase separation to occur during the absorption of carbon dioxide and renders the process unworkable.

In the present invention, the carbon dioxide absorbent may be dissolved in water before use. The water may be used preferably in an amount of 1.0 to 10.0 wt. %, and more preferably 1.0 to 9.0 wt. %, with respect to the total weight of the absorbent. With a content of water less than 1.0 wt. % with respect to the total weight of the absorbent, it causes the absorbent to severely absorb the water in the gaseous phase during the process and hence changes the composition of the absorbent, so that the absorbent becomes difficult to maintain in water balance. A content of water greater than 9.0 wt. % intensifies the thermal denaturation of the absorbent and increases the latent heat during desorption of carbon dioxide.

In the case of a conventional aqueous absorbent most part of which is composed of water, a large amount of water vapor is produced during regeneration of the absorbent, which requires a large amount of latent heat and results in high energy consumption and low absorption rate. In contrast, the present invention uses a small amount of water and hence solves all the problems with the conventional aqueous absorbent.

In another aspect of the present invention, there is provided a carbon dioxide separation method using the above-mentioned carbon dioxide absorbent to separate carbon dioxide from a gas mixture containing carbon dioxide, the method including: (1) using the carbon dioxide absorbent to absorb carbon dioxide from a gas mixture including carbon dioxide; and (2) desorbing the captured carbon dioxide from the carbon dioxide absorbent.

Examples of the gas mixture containing carbon dioxide may include natural gas and exhaust gas emitted from chemical plants, power plants, and large-sized furnaces.

In the step (1), absorption of carbon dioxide may be conducted under conditions of an absorption temperature ranging from 10° C. to 80° C., and preferably from 20° C. to 60° C.; and an absorption pressure ranging from atmospheric pressure to 50 atm, and preferably from atmospheric pressure to 30 atm. When the absorption temperature is above 60° C., desorption of carbon dioxide takes place along with absorption at the same time, resulting in reducing the amount of absorbed carbon dioxide. When the absorption temperature is below 20° C., there is a need for an additional cooling facility to lower the temperature, declining economic feasibility. As the pressure of the exhaust gas is atmospheric, it is most economical to perform absorption of carbon dioxide under the atmospheric pressure. With an absorption pressure higher than 30 atm, there may be a large increase in the amount of absorbed carbon dioxide, yet an additional facility such as compressors to raise the pressure is necessary, resulting in a problem associated with poor economic feasibility.

In the step (2), desorption of carbon dioxide may be conducted under conditions of a desorption temperature ranging from 60° C. to 150° C., and preferably from 70° C. to 150° C.; and a desorption pressure ranging from atmospheric pressure to 10 atm. A desorption temperature below 70° C. makes desorption of carbon dioxide unfeasible. When the desorption temperature is above 150° C., the absorbent works as the MEA absorbent does and fails to make beneficial effects of two-component absorbents associated with the present invention. Further, desorption is unworkable under high pressure, and for this reason, the vapor pressure of water needs to be increased in order to maintain the high-pressure condition, causing a problem with economic feasibility. It is therefore preferable to perform desorption under the pressure from atmospheric pressure to 10 atm.

Throughout the specification of the present invention, the term "atmospheric pressure" refers to 1 atm as "normal pressure".

Hereinafter, a further detailed description will be given as to the configuration and functions of the present invention with reference to examples and comparative examples, which are for better illustration of the present invention and not construed to limit the scope of the present invention.

Examples 1 to 5

2,2'-iminobis(N,N-dimethylethylamine) (IBDMPA, CAS No. 6711-48-4) as a main absorbent constituent, tetraethylene glycol dimethyl ether (tetraEGDME, CAS No. 143-24-8) as a rate enhancer, and water were mixed together to prepare an absorbent having a composition as given in percentage by weight in Table 1. 20 g of the absorbent was loaded to perform a carbon dioxide absorption experiment with a thermostat temperature maintained at 40° C.

Comparative Example 1

The procedures were performed in the same manner as described in Example 1, excepting that diethylene glycol butyl ether (DEGBME) was used as a rate enhancer to prepare an absorbent having a composition as given in percentage by weight in Table 1.

Comparative Example 2

The procedures were performed in the same manner as described in Example 1, excepting that triethylene glycol dimethyl ether (TriEGDME) was used as a rate enhancer to prepare an absorbent having a composition as given in percentage by weight in Table 1.

Comparative Example 3

The procedures were performed in the same manner as described in Example 1, excepting that an aqueous solution containing 30 wt. % of monoethanolamine (MEA) was used as an absorbent.

Comparative Example 4

The procedures were performed in the same manner as described in Example 1, excepting that an aqueous solution containing 30 wt. % of piperazine (PZ) was used as an absorbent.

TABLE 1

| | Ingredients of Absorbent | | | | | | |
|---|---|---|---|---|---|---|---|
| | IBDMPA | TetraEGDME | Water | DEGBME | TriEGDME | MEA | PZ |
| Example 1 | 60 | 31 | 9 | — | — | — | — |
| Example 2 | 60 | 33 | 7 | — | — | — | — |
| Example 3 | 60 | 35 | 5 | — | — | — | — |
| Example 4 | 60 | 37 | 3 | — | — | — | — |
| Example 5 | 70 | 21 | 9 | — | — | — | — |
| Comparative Example 1 | 60 | — | 10 | 30 | — | — | — |
| Comparative Example 2 | 60 | — | 10 | — | 30 | — | — |
| Comparative Example 3 | — | — | 10 | — | — | 30 | — |
| Comparative Example 4 | — | — | 10 | — | — | — | 30 |

Examples 6 to 9

2,2'-iminobis(N,N-dimethylethylamine) (IBDMPA, CAS No. 6711-48-4) as a main absorbent constituent, tetraethylene glycol dimethyl ether (tetraEGDME, CAS No. 143-24-8) as a rate enhancer, and water were mixed together to prepare an absorbent having a composition as given in percentage by weight in Table 2. 20 g of the absorbent was loaded to perform a carbon dioxide absorption experiment with a thermostat temperature maintained at 40° C.

Comparative Example 5

The procedures were performed in the same manner as described in Example 6, excepting that an absorbent was prepared to have a composition as given in percentage by weight in Table 2.

Comparative Example 6

The procedures were performed in the same manner as described in Example 1, excepting that triethylene glycol dimethyl ether (TriEGDME) was used as a rate enhancer to prepare an absorbent having a composition as given in percentage by weight in Table 2. [Table 2]

TABLE 2

| | Ingredients of Absorbent | | | | | | |
|---|---|---|---|---|---|---|---|
| | IBDMPA | TetraEGDME | Water | DEGBME | TriEGDME | MEA | PZ |
| Example 6 | 65 | 30 | 5 | — | — | — | — |
| Example 7 | 70 | 25 | 5 | — | — | — | — |
| Example 8 | 63 | 30 | 7 | — | — | — | — |
| Example 9 | 68 | 30 | 2 | — | — | — | — |
| Comparative Example 5 | 40 | 15 | 45 | — | — | — | — |
| Comparative Example 6 | 40 | — | 45 | — | 15 | — | — |

The carbon dioxide absorbents according to Examples 1 to 9 and Comparative Examples 1 to 6 were measured in regards to properties through the following experimental examples. The measurement results are presented in Tables 3 and 4.

Experimental Examples

1. $CO_2$ Absorption Capacity and Absorption Heat $CO_2$ absorption capacity and $CO_2$ absorption heat were deducted from the data of gas-liquid equilibrium between the absorbent and carbon dioxide ($CO_2$). The experimental data were acquired through the equilibrium cell (EC) technique commonly used in the studies of $CO_2$ absorbents.

(1) $CO_2$ Working Absorption Capacity $CO_2$ working absorption capacity is the difference between the values of $CO_2$ lean loading and $CO_2$ rich loading, where the lean loading value is the amount of $CO_2$ absorbed into a solution (lean solution) fed to an absorption tower; and the rich loading value is the amount of $CO_2$ absorbed into a solution (rich solution) discharged from the absorption tower. There are a variety of methods for determining the working absorption capacity in the development step of a general $CO_2$ absorbent. One of the methods involves using gas-liquid equilibrium data (at 40° C.) to determine the values of $CO_2$ lean loading and rich loading of a solution having a $CO_2$ equilibrium partial pressure of 0.05 to 5 kPa, which values correspond to a $CO_2$ loading value of the solution entering the absorption tower and a $CO_2$ loading value of the solution discharged from the absorption tower, respectively; and calculating an working absorption capacity from the difference between the values of $CO_2$ lean loading and $CO_2$ rich loading.

(2) $CO_2$ Absorption Heat $CO_2$ absorption heat was calculated from gas-liquid equilibrium data at different temperatures using the Gibbs-Helmholtz thermodynamic equation (Cited paper document: "The Gibbs-Helmholtz Equation and the Thermodynamic consistency of Chemical Absorption Data").

Figure 1:
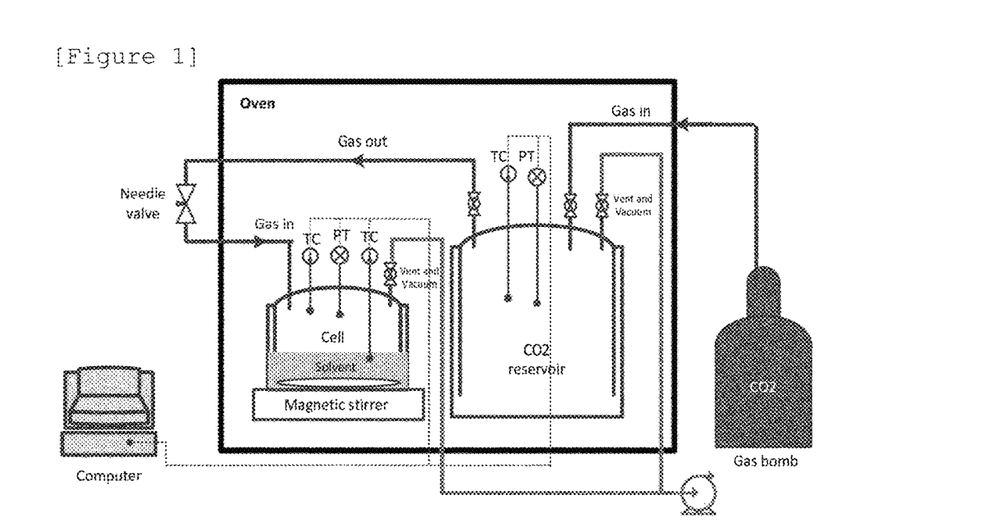
FIG. 1 is a schematic diagram showing an equilibrium cell (EC) apparatus commonly used in studies on gas-liquid equilibrium between carbon dioxide and absorbents.
Figure 2:
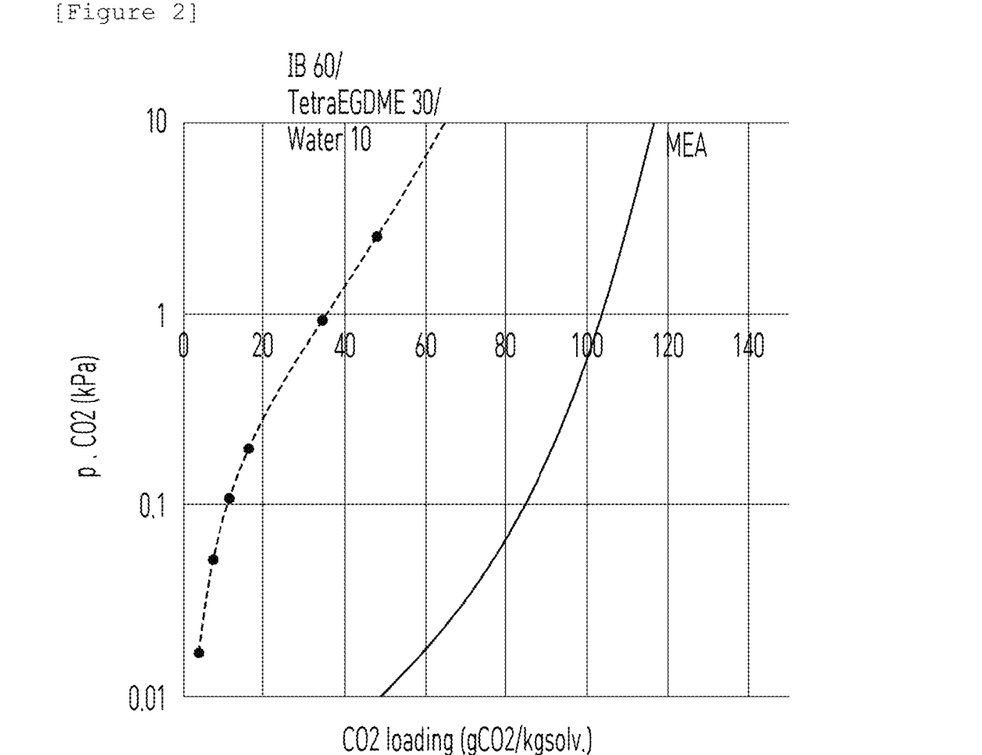
FIG. 2 is a graph showing gas-liquid equilibrium between carbon dioxide and absorbents.
Figure 3:
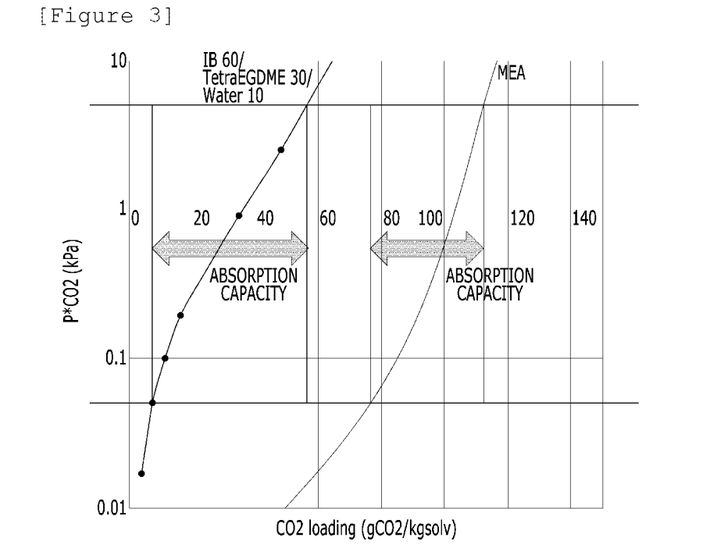
FIG. 3 is a graph showing a calculation example to determine the working absorption capacity of a carbon dioxide absorbent.

FIG. 1 is a schematic diagram showing an equilibrium cell (EC) apparatus commonly used in studies on gas-liquid equilibrium between $CO_2$ and absorbents. FIG. 2 is a graph showing gas-liquid equilibrium between $CO_2$ and absorbents, where the left-sided graph presents the gas-liquid equilibrium data of the carbon dioxide absorbent of Example 1; and the right-sided graph presents the gas-liquid equilibrium data of Comparative Example 3. FIG. 3 is a graph showing a calculation example to determine the working absorption capacity of a $CO_2$ absorbent, where the left-sided graph presents the working absorption capacity of the $CO_2$ absorbent of Example 1; and the right-sided graph presents the working absorption capacity of the $CO_2$ absorbent of Comparative Example 3.

Figure 4:
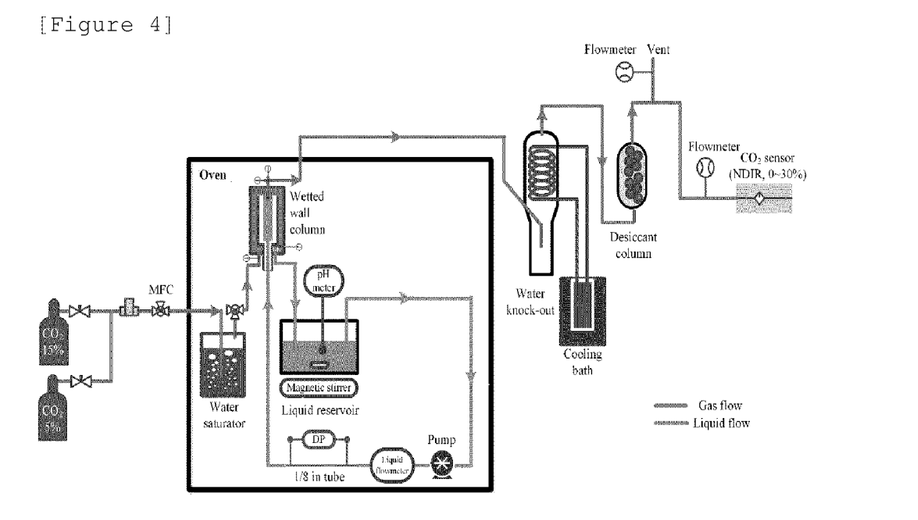
FIG. 4 is a diagram showing a wetted-wall column used as equipment for absorption rate measurement.
Figure 5:
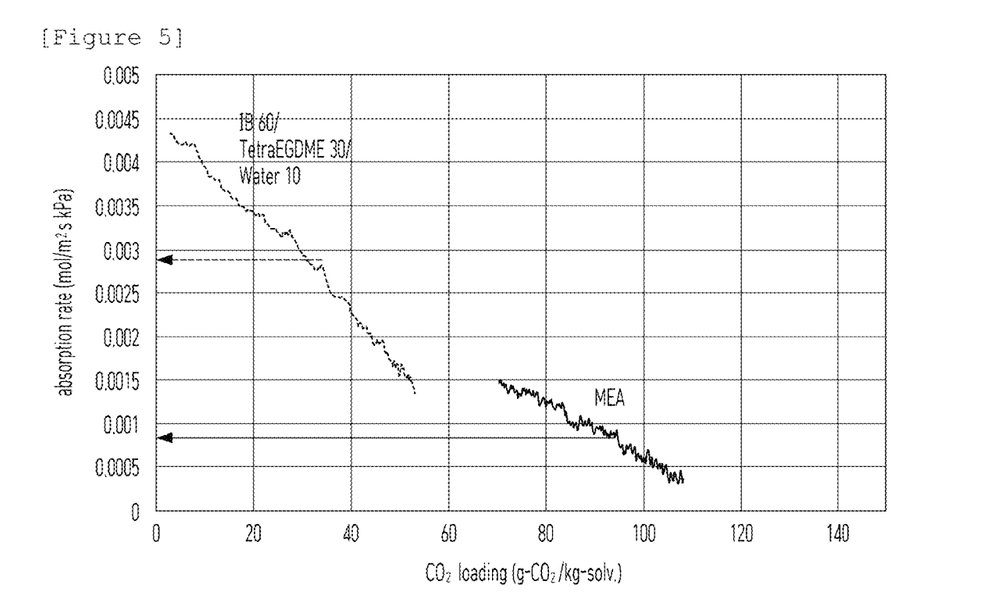
FIG. 5 is a graph showing the carbon dioxide absorption rate into an absorbent.

2. Average Absorption Rate $CO_2$ absorption rate, the rate of an absorbent's absorbing $CO_2$ in an absorption tower, was measured experimentally with a wetted-wall column used as equipment for absorption rate measurement. The absorption rate is a function of the temperature and $CO_2$ loading of the absorbent. For impartial comparison of absorption rate in an absorption tower, an average absorption rate was defined as the average value of absorption rates in the lean solution and rich solution at 40° C. FIG. 4 is a diagram showing a wetted-wall column used as equipment for absorption rate measurement. FIG. 5 is a graph showing the absorption rate of a $CO_2$ absorber, where the left-sided graph presents the absorption rate of Example 1; and the right-sided graph presents the absorption rate of Comparative Example 3.

3. Evaporation Loss

Figure 6:
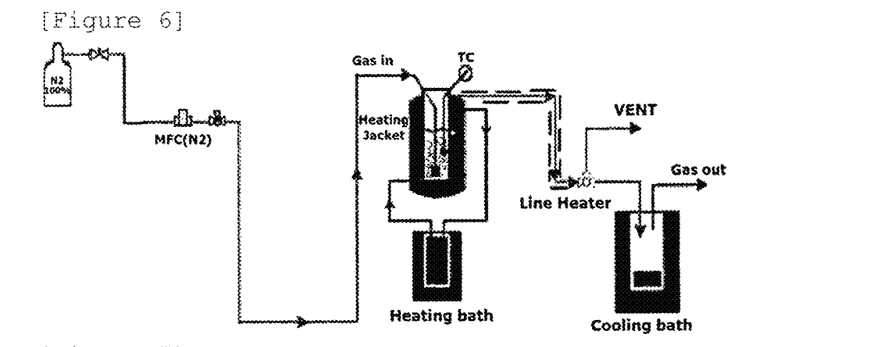
FIG. 6 is a diagram showing an experimental setup for measuring an evaporation loss of an absorbent.

Evaporation loss refers to a loss of the absorbent flowing out along with a gas flowing upward out of an absorption tower. In order to quantify the evaporation loss in the development step of an absorber, a defined amount of $N_2$ was blown into the lean solution at 40° C., which was similar to the conditions in the topside of the absorption tower, and the gas flowing out of the solution was cooled down to obtain a condensed absorbent, which was then analyzed by GC. FIG. 6 is a schematic diagram showing an experimental setup for measuring an evaporation loss.

4. Thermal Denaturation

Figure 7:
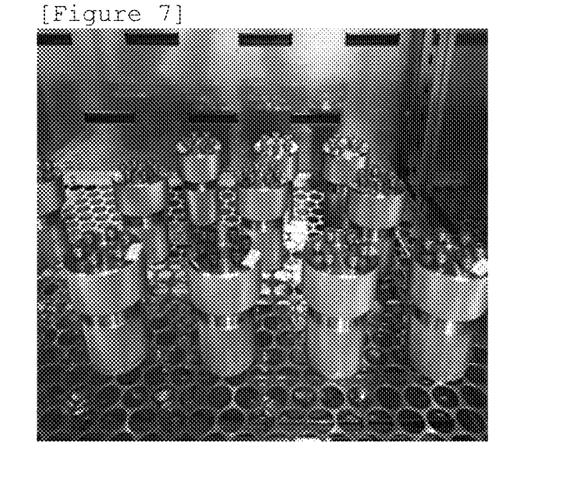
FIG. 7 is a diagram showing an experimental setup for measuring thermal denaturation of an absorbent.
Figure 8:
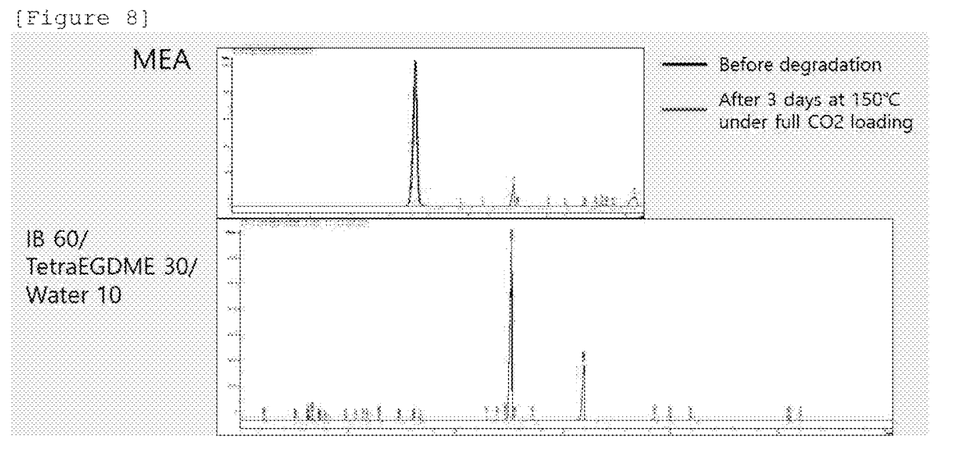
FIG. 8 is a GC analytical graph for measuring thermal denaturation.

Thermal denaturation takes place chiefly due to high temperatures in a desorption tower. In order to quantify the thermal denaturation in the development step of an absorber, a rich solution was stored in a closed container for 3 days at 150° C., which was similar to the conditions of the desorption tower, and the amount of the solution denatured by heat in the meanwhile was calculated. The amount of the denatured solution was determined from the difference of peak areas in the GC analysis of the solution before and after the testing. FIG. 7 is a diagram showing an experimental setup for measuring thermal denaturation. FIG. 8 is a GC analytical graph for measuring thermal denaturation, where the upper graph is for the $CO_2$ absorbent of Comparative Example 3; and the lower graph is for the $CO_2$ absorbent of Example 1.

TABLE 3

|  | $CO_2$ absorption capacity (g$CO_2$/kg solv) | Absorption heat (kJ/mol $CO_2$) | Average $CO_2$ absorption rate (mol $CO_2$/m$^2$ · s · kPa) | Evaporation loss (g/t$CO_2$) | Thermal denaturation |
|---|---|---|---|---|---|
| Example 1 | 48 | 65 | 2.8 | IBDMPA 2.07 TetraEGDME 0.094 | 1.20% |
| Example 2 | 46 | 65 | 2.9 | IBDMPA 2.07 TetraEGDME 0.096 | 1.15% |
| Example 3 | 43 | 63 | 3 | IBDMPA 2.07 TetraEGDME 0.096 | 1.30% |
| Example 4 | 42 | 62 | 3.2 | IBDMPA 2.07 TetraEGDME 0.097 | 1.23% |
| Example 5 | 60 | 65 | 3 | IBDMPA 2.07 TetraEGDME 0.09 | 1.52% |
| Comparative Example 1 | 45 | 72 | 2.8 | IBDMPA 2.07 DEGBME 0.67 | 8.30% |
| Comparative Example 2 | 53 | 72 | 2.9 | IBDMPA 2.07 TriEGDME 0.53 | 9.45% |
| Comparative Example 3 | 38 | 88 | 0.75 | MEA 0.74 | 9.45% |
| Comparative Example 4 | 60 | 70 | 1.8 | — | 5.24% |

As can be seen from Table 3, the carbon dioxide absorbent of the present invention had high working absorption capacity, low absorption heat and hence high energy efficiency, displayed high $CO_2$ absorption rate and low evaporation loss, and underwent very low thermal denaturation even at high temperature of 150° C. while carbon dioxide was captured.

In contrast, the carbon dioxide absorbents of Comparative Examples 1 and 2 had high working absorption heat and hence low energy efficiency but showed a considerably degree of thermal denaturation and a high evaporation loss of diethylene glycol butyl ether (DEGBME) and triethylene glycol dimethyl ether (TriEGDME) used as a rate enhancer and a low content of water. Further, the conventional carbon dioxide absorbents of Comparative Examples 3 and 4 also had high absorption heat and hence low energy efficiency and showed a considerably low $CO_2$ absorption rate and a considerably high degree of thermal denaturation due to high water content in relation to the carbon dioxide absorbents of the present invention.

TABLE 4

| | CO$_2$ absorption capacity (gCO$_2$/kg solv) | Absorption heat (kJ/mol CO$_2$) | Average CO$_2$ absorption rate (mol CO$_2$/m$^2$ · s · kPa) | Evaporation loss (g/tCO$_2$) | Thermal denaturation |
|---|---|---|---|---|---|
| Example 6 | 50 | 67 | 3.1 | IBDMPA 2.03 TetraEGDME 0.095 | 0.95% |
| Example 7 | 62 | 69 | 2.9 | IBDMPA 2.07 TetraEGDME 0.009 | 1.01% |
| Example 8 | 49 | 68 | 2.9 | IBDMPA 2.1 TetraEGDME 0.093 | 1.05% |
| Example 9 | 53 | 67 | 2.9 | IBDMPA 2.15 TetraEGDME 0.094 | 1.03% |
| Comparative Example 5 | 78 | 68 | 1.7 | IBDMPA 1.95 TetraEGDME 0.07 | 42.5% |
| Comparative Example 6 | 89 | 70 | 1.33 | IBDMPA 1.98 TriEGDME 0.31 | 48.2% |

The present invention has been described with reference to the particular illustrative embodiments, which are not intended to limit the scope of the present invention but susceptible to many changes and modifications without departing from the scope and spirit of the present invention.

What is claimed is:

1. A carbon dioxide absorbent comprising a triamine, an ether, and water,
    wherein the triamine is selected from the group consisting of 2,2'-iminobis (N,N'-dimethylethylamine), N,N-bis[2-(methylamino)ethyl]methylamine, N,N-bis[3-(methylamino)propyl]methylamine, N,N'-(iminobisethylene)bismethanamine, and N,N'-(iminobispropylene)bismethanamine, and
    wherein the ether is a tetraalkylene glycol dialkyl ether and selected from the group consisting of tetraethylene glycol dimethyl ether, tetraethylene glycol diethyl ether, tetraethylene glycol dipropyl ether, tetraethylene glycol dibutyl ether, tetrapropylene glycol dimethyl ether, tetrapropylene glycol diethyl ether, tetrapropylene glycol dipropyl ether, and tetrapropylene glycol dibutyl ether,
    wherein the ether is contained in an amount of 20 to 40 wt. % with respect to the total weight of the absorbent,
    wherein the water is comprised in an amount of 1.0 to 9.0 wt. % with respect to the total weight of the absorbent, and
    wherein the triamine is contained in an amount of 50 to 90 wt. % with respect to the total weight of the absorbent.

2. A carbon dioxide separation method comprising:
    (1) using the carbon dioxide absorbent as claimed in claim 1 to absorb carbon dioxide from a gas mixture comprising carbon dioxide; and
    (2) desorbing the captured carbon dioxide from the carbon dioxide absorbent.

3. The carbon dioxide separation method as claimed in claim 2, wherein an absorption temperature in the step (1) ranges from 20° C. to 60° C.

4. The carbon dioxide separation method as claimed in claim 2, wherein an absorption pressure in the step (1) ranges from atmospheric pressure to 30 atm.

5. The carbon dioxide separation method as claimed in claim 2, wherein a desorption temperature in the step (2) ranges from 70° C. to 150° C.

6. The carbon dioxide separation method as claimed in claim 2, wherein a desorption pressure in the step (2) ranges from atmospheric pressure to 10 atm.

* * * * *